UNITED STATES PATENT OFFICE.

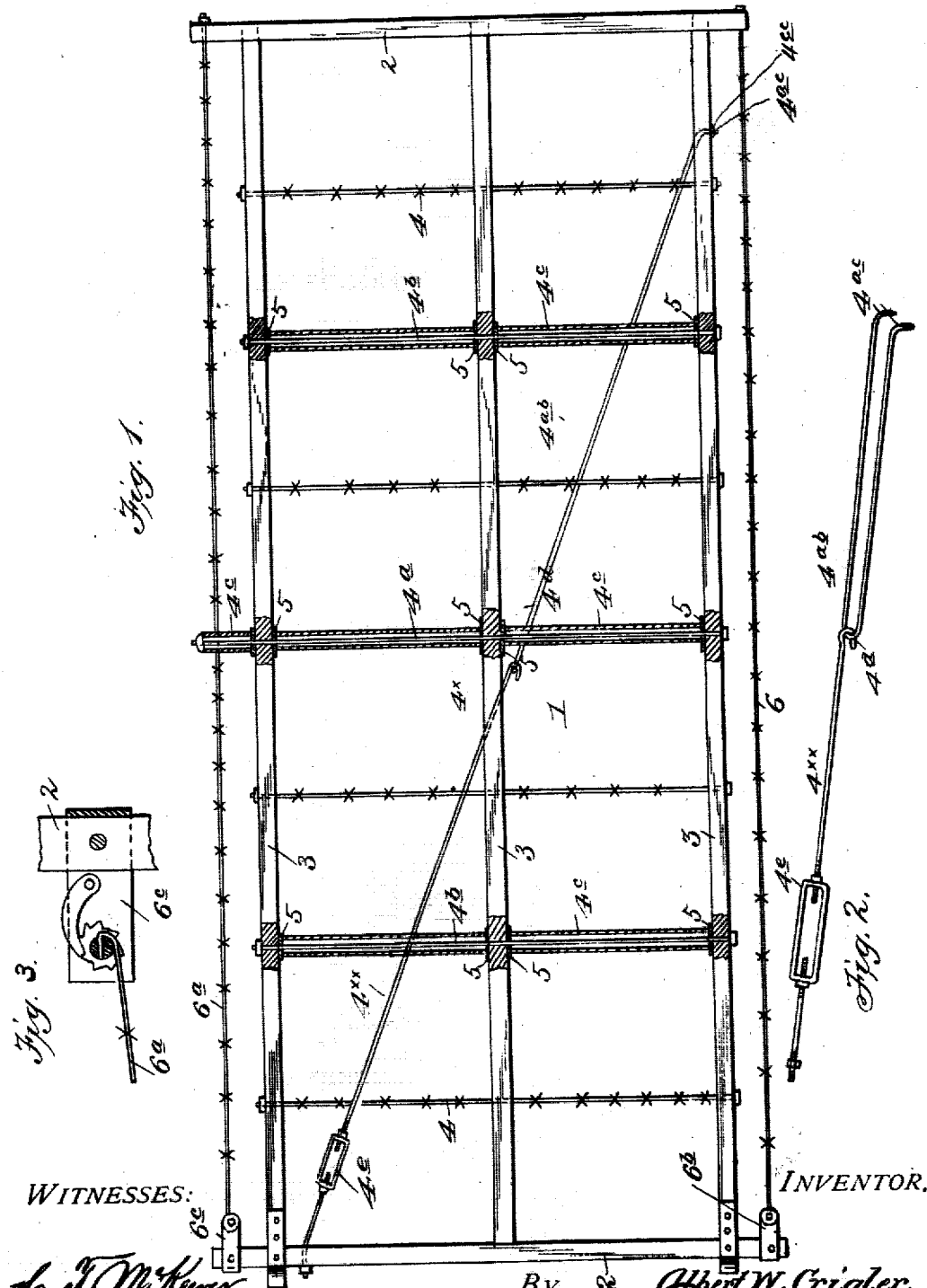

ALBERT W. CRIGLER, OF FOREST HILL, INDIANA.

GATE.

No. 827,423.

Specification of Letters Patent.

Patented July 31, 1906.

Application filed February 6, 1906. Serial No. 299,787.

*To all whom it may concern:*

Be it known that I, ALBERT W. CRIGLER, a citizen of the United States, residing at Forest Hill, in the county of Decatur and State of Indiana, have invented certain new and useful Improvements in Gates, of which the following is a specification.

My invention relates to improvements in gates, more particularly for farm purposes, while it is equally adapted for other inclosures.

It has for its object to provide for readily compensating any tendency of the gate to sag at its forward or practically unsupported end; to guard against the gate being dislodged or wrenched from its position or opened by animals, also against the passing thereunder of small animals or the lifting of the same by the latter; to render the gate strong and durable, and to carry out these ends in a simple, economic, and effective manner.

Said invention therefore consists of certain structural features, substantially as hereinafter fully disclosed, and specifically pointed out by the claims.

In the accompanying drawings, illustrating the preferred embodiment of my invention, Figure 1 is a side elevation thereof. Figs. 2 and 3 are enlarged detailed perspective views of the same, showing the disassembled members or parts of the gate-brace for compensating any sag which may result thereto in use, as presently made apparent.

In carrying out my invention I construct the gate 1, as shown, principally of end uprights or bars 2, longitudinal or horizontal bars 3, preferably three in number, making connection with said uprights at points below and above their respective ends, additional uprights or rods 4 $4^a$ $4^b$, passed through and suitably held in said horizontal bars 3, and a diagonal brace $4^x$, presently more fully described. The rods $4^a$ and $4^b$ have slipped thereon intermediately of the longitudinal or horizontal bars 3 metallic sleeve or tube sections $4^c$, having, preferably, metallic washers 5 interposed between them and said bars. The central longer rod or upright $4^a$ extends a short distance above the top longitudinal bar 3, the extension thus formed having also a sleeve or tube section $4^c$ slipped thereon, the purpose of which will presently be seen.

Secured to the lower and upper projecting end portions of the end bars or uprights 2 are barb-equipped longitudinal wires 6 $6^a$, respectively. The connection between the barb-equipped guarding wires or members 6 $6^a$ and the rear gate end bar may be and is effected preferably by a ratchet-and-pawl arrangement $6^b$ $6^c$, respectively, the same being adapted to retain said wires under proper stress and provide for the ready adjustment thereof in effective position.

The diagonal brace $4^x$ comprises a turnbuckle-equipped rod member $4^{xx}$ and a practically U or yoke shaped member $4^{ab}$, the latter striding the central sleeve-equipped rod $4^a$ below the central horizontal bar 3 at its bowed end portion and having its remaining portion similarly arranged with relation to the rods forward of the latter rod. The lower forward ends of said brace member $4^{ab}$ are extended or bent downward, as at $4^a$, for their insertion through said bottom bar or rail, the downward-bent terminals $4^{ac}$ thus formed being equipped with and held in place by suitable nuts $4^c$, screwed thereon below the latter. The turnbuckle-equipped rod member $4^{xx}$ is passed through the central longitudinal gate-bar and terminates at its lower end into a hook or bend $4^d$, adapted to engage and be held in the upper bowed end of the brace member $4^{ab}$, the opposite end of said rod member being passed through and suitably secured in the rear end bar of the gate near the upper longitudinal bar or rail thereof. The turnbuckle equipment of the brace-rod member (designated by the character $4^e$) provides, as is obvious, for compensating slack, thus preventing the tendency to sagging of the gate, while the other structural features of the gate add to its strength and durability, accordingly to its usefulness, as will be readily appreciated.

I claim—

1. A gate comprising end uprights, longitudinal or horizontal bars effecting connection with the aforesaid uprights, intermediate vertical rods extending transversely through said bars, and equipped with sleeve or tube sections, with washers interposed between the ends or edges thereof and said longitudinal bars.

2. A gate having a diagonal brace comprising a practically yoke or U shaped member having downward-extended and nutequipped terminals passed through the gate bottom rail and secured, and a hooked rod member engaging the bowed end of the aforesaid member and passed through the central longitudinal gate-bar, the upper end of said rod member being suitably secured to the rear end gate upright or bar.

In testimony whereof I have signed my name to this specification in the presence of two subscribing witnesses.

ALBERT W. CRIGLER.

Witnesses:
PERRY G. CAPPER,
HERSCHEL POWNER.